No. 673,948. Patented May 14, 1901.
J. H. GOLLYER.
HOG OR CATTLE TRAP.
(Application filed Feb. 28, 1901.)
(No Model.) 3 Sheets—Sheet 1.

Inventor
J. H. Gollyer

No. 673,948. Patented May 14, 1901.
J. H. GOLLYER.
HOG OR CATTLE TRAP.
(Application filed Feb. 28, 1901.)
(No Model.) 3 Sheets—Sheet 2.
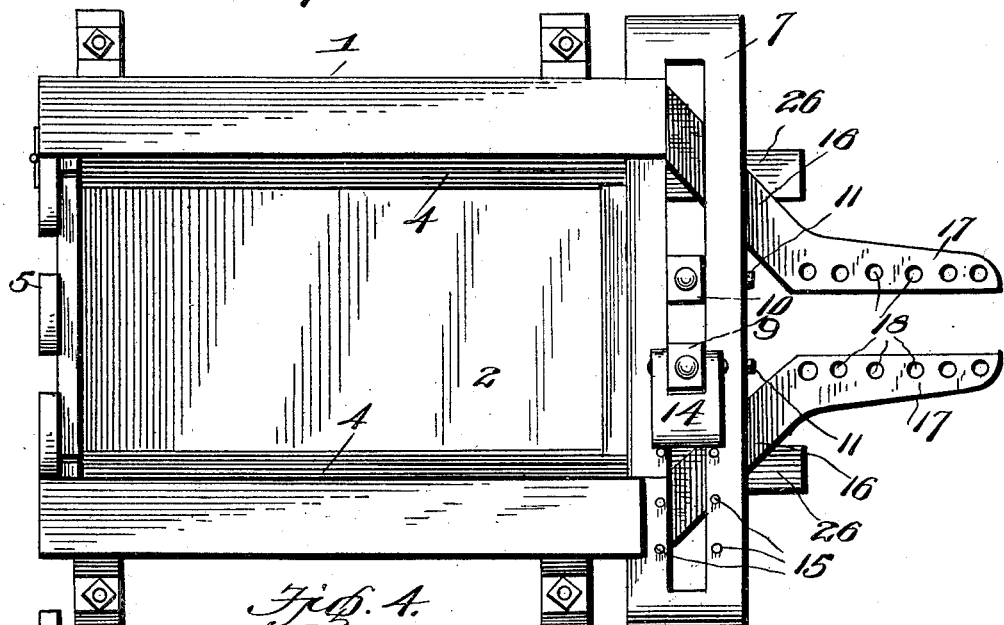
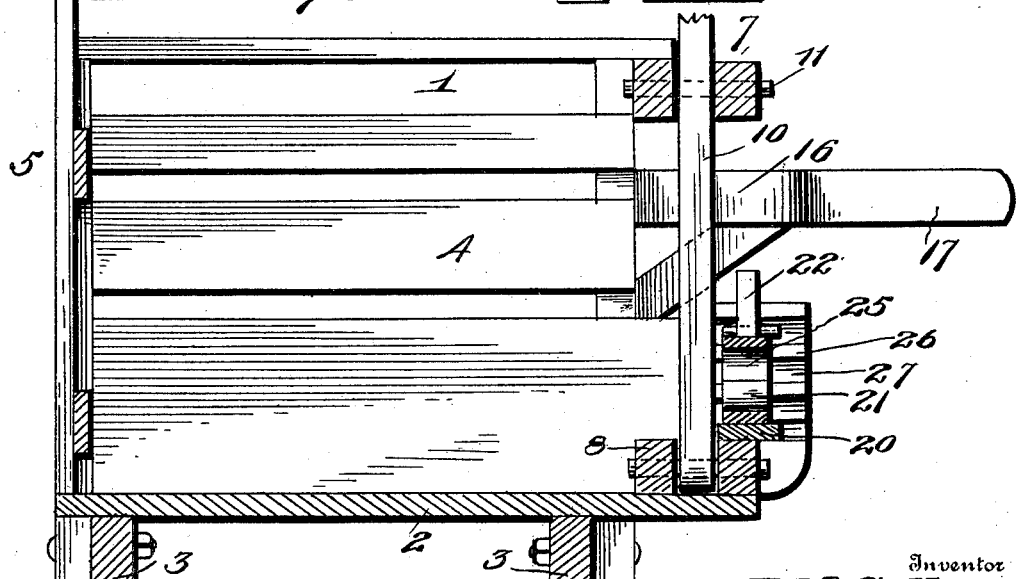
Inventor
J. H. Gollyer
Witnesses
By
Attorneys No. 673,948. Patented May 14, 1901.
J. H. GOLLYER.
HOG OR CATTLE TRAP.
Application filed Feb. 28, 1901.
(No Model.) 3 Sheets—Sheet 3.
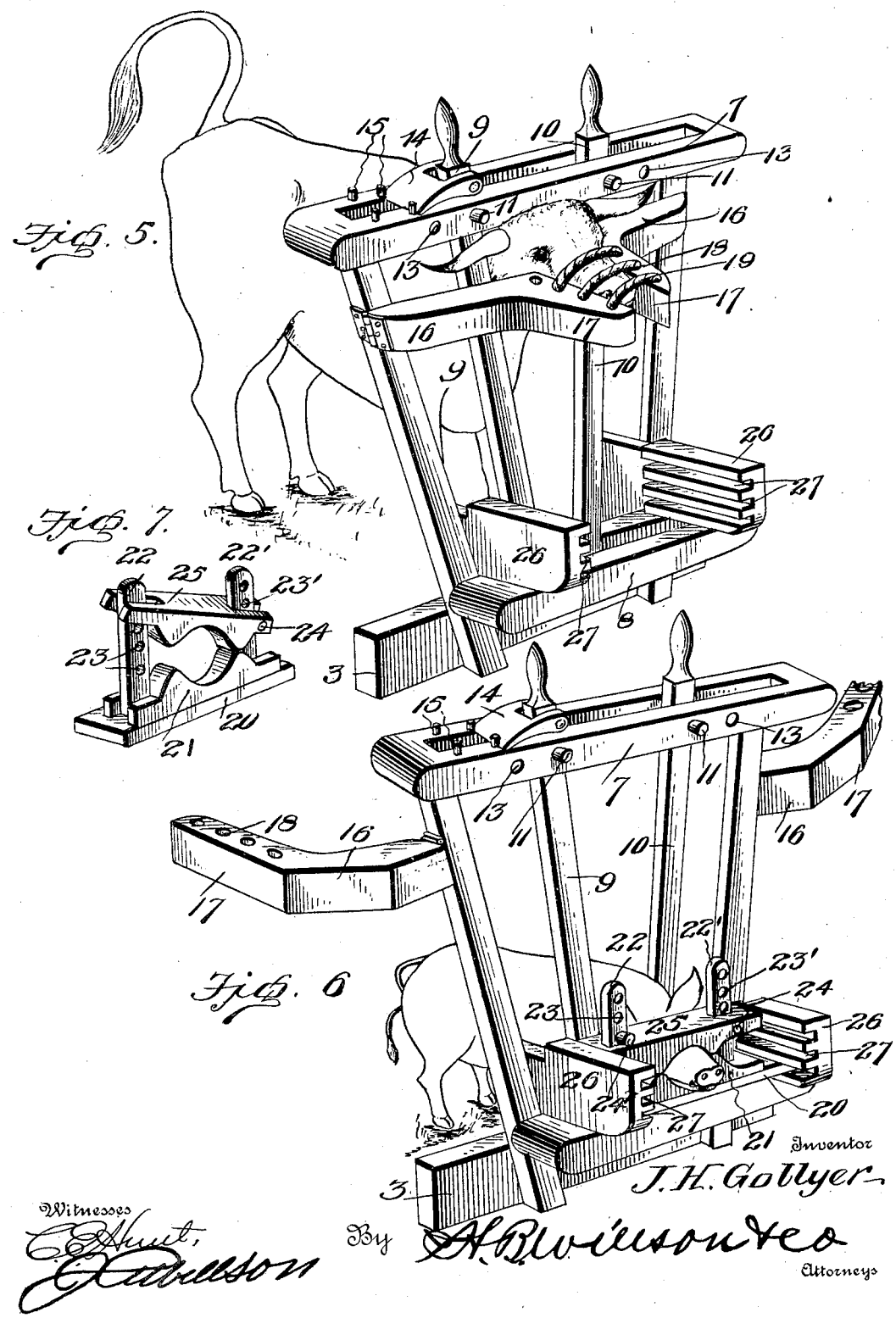

UNITED STATES PATENT OFFICE.

JOHN H. GOLLYER, OF PEARL, ILLINOIS.

HOG OR CATTLE TRAP.

SPECIFICATION forming part of Letters Patent No. 673,948, dated May 14, 1901.

Application filed February 28, 1901. Serial No. 49,326. (No model.)

*To all whom it may concern:*

Be it known that I, JOHN HENRY GOLLYER, a citizen of the United States, residing at Pearl, in the county of Pike and State of Illinois, have invented certain new and useful Improvements in Hog or Cattle Traps; and I do declare the following to be a full, clear, and exact description of the invention, such as will enable others skilled in the art to which it appertains to make and use the same.

This invention relates to an improved stock-stall or pen adapted for use in dehorning and branding cattle, ringing hogs, altering horses and calves, breaking young heifers into milking, and other similar purposes.

The object of the invention is to provide a device of this character which is comparatively simple of construction, convenient and effective in use, and which embodies certain novel features of construction, combination, and arrangement of parts, as will be hereinafter more fully described, and particularly pointed out in the appended claims.

Figure 1:
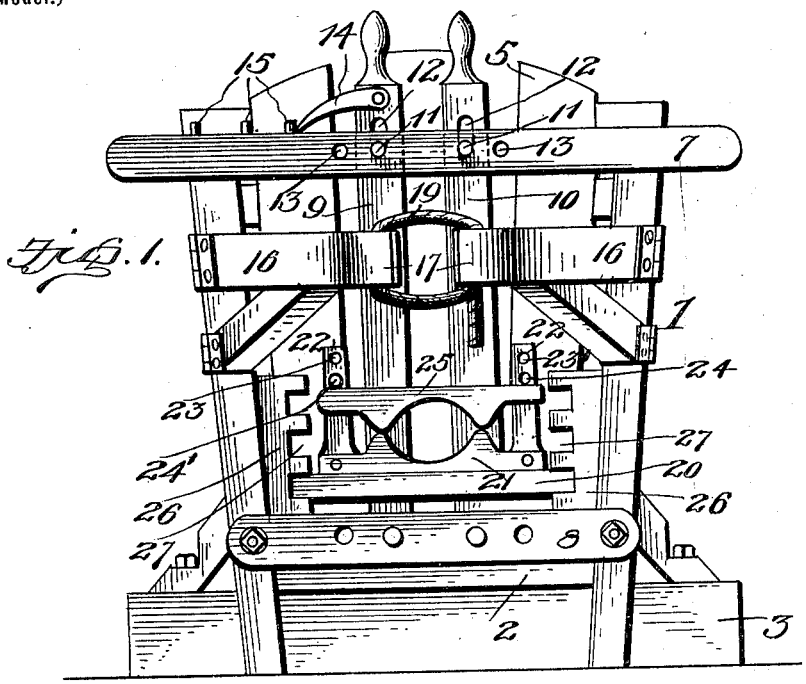
Figure 2:
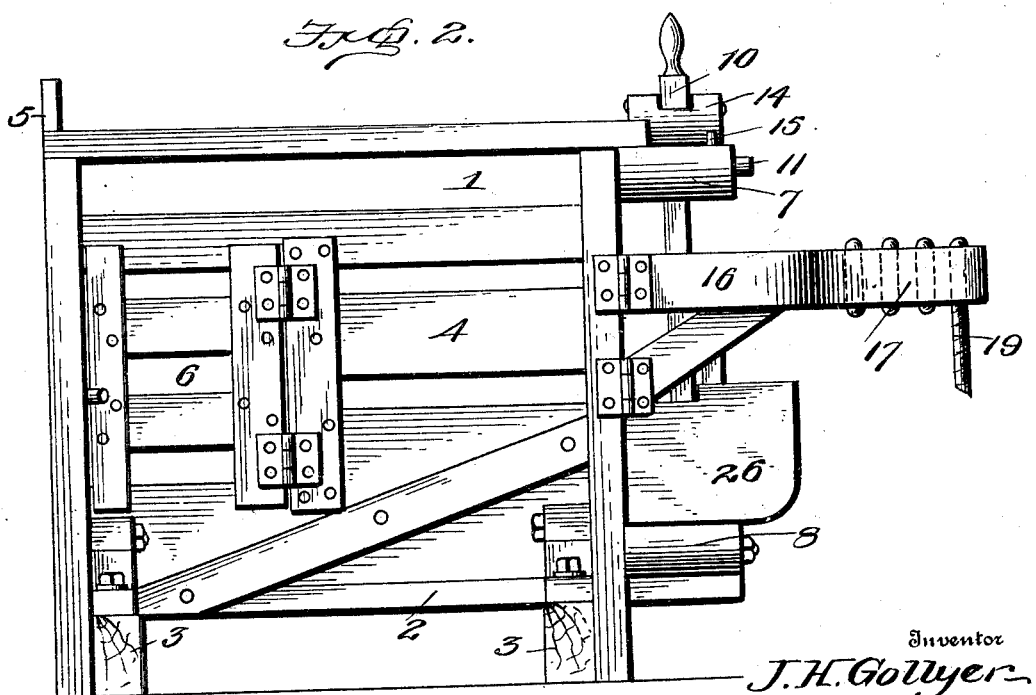

In the accompanying drawings, Figure 1 is a front elevation of a stock-stall or pen embodying my invention. Fig. 2 is a side elevation of the same. Fig. 3 is a top plan view. Fig. 4 is a vertical longitudinal section. Fig. 5 is a perspective view illustrating the mode of use of the head yoke or clamp. Fig. 6 is a similar view illustrating the mode of use of the nose-stocks. Fig. 7 is a detail perspective view of the nose-stocks.

Referring now more particularly to the drawings, the numeral 1 represents the rectangular pen or stock-stall, comprising a floor 2, forming the bottom, sills 3, on which said floor is supported, and sides 4, the rear wall being formed by a hinged door 5 and the front wall by the stock-confining devices and coöperating parts hereinafter described. The stock enters and leaves through the doorway at the rear end of the stall and is confined by closing the door 5. A hinged side door or gate 6 is provided in one of the sides 4, through which the operator or attendant obtains access to the pen for milking, altering, shoeing, or otherwise treating or operating upon the confined animal. The parts of the pen or stall are preferably bolted or otherwise detachably fitted together, so that the device may be taken down and stored away when not required for use.

At top and bottom of the front end of the pen are slotted transverse guides 7 and 8, each formed by a pair of spaced parallel bars, and mounted in the guides are the vertical clamping-bars or stanchions 9 and 10, which are adapted to confine the head of the animal. These bars are adjustable toward or from each other through the medium of pins 11, passed through openings 12 therein and through corresponding openings of registering rows of openings 13 in the bars of said guides 7 and 8. The bar 10 may be primarily adjusted and held stationary by a pin at top and bottom, while the bar 9 is left free at top and allowed to pivot upon its lower securing-pin, so that when the animal sticks his head between said bars 9 and 10 the bar 9 may be swung toward the bar 10 to confine the head of the animal and prevent its withdrawal. The upper end of the bar 9 may be secured by a pin 11 and may be provided in addition with a pivotal pawl 14 to engage rack-pins 15 on the guide 7, so that said bar will be automatically locked when swung inward to the required extent and then, if desired, more securely held by a pin 11, which will obviate all liability of an opening movement of said bar 9 under pressure should, from any cause, the pawl become accidentally disengaged from the coöperating rack-pin. The upper ends of the bars 9 and 10 are preferably formed into handles to enable them to be readily and conveniently manipulated. In practice it will of course be understood that the hog or other animal to be confined is driven into the pen through the door 5 and said door closed, and when the animal in attempting to escape shoves his head out between the bars 9 and 10 the bar 9 is quickly adjusted to secure the animal. In milking or altering an animal the operator passes into and out of the pen through the door 6, while in ringing or dehorning the operator works at the front and upon the exterior of the pen, as will be readily understood.

In shoeing horses, dehorning cattle, ringing hogs, and performing other similar operations and veterinary work it is extremely desirable to hold the head of the animal firmly against vertical and sidewise movements, and to this end I provide clamps so constructed and arranged as to be adapted for a variety of animals. For holding the heads of horses, cattle, and other large animals I provide two pivoted laterally-swinging arms 16, having jaws 17 at their outer ends to bear at opposite sides upon the jaws of the animal, as shown in Fig. 5, and forming a head-yoke to prevent the animal from swinging or tossing his head sidewise. The jaws are formed with a series of openings 18, through which a rope 19, secured to one of said jaws, is threaded back and forth to connect the jaws and bind the head of the animal against an up-and-down movement. By the use of this construction of clamp the head of the animal will be rigidly held while dehorning or other surgical work is being performed or while the animal is being shod, thus leaving the operator free to perform the work in the most convenient and expeditious manner. For ringing hogs and carrying out other similar work I provide a head-stock, consisting of a base 20, on which is mounted the fixed clamping-bar 21, bifurcated at its end for passage of fixed standards 22 22', formed each with a plurality of openings 23 23'. To one of these standards is pivotally connected, as by a pin 24, passing through one of the openings 23' therein, the upper movable clamping-bar 25, which is bifurcated at its ends for passage of said standards 22 22' and is adapted to be secured at its opposite end by a pin 24', passed through one of the openings 23 in the standards 22. The bar 25 may be adjusted in an obvious manner for the reception of different-sized heads. The stock is set by swinging the bar 25 to the open position, (shown in Fig. 7,) and when the animal inserts his head between the same and the bar 21 said bar 25 is swung down and secured by the pin 24', whereby the animal's head will be confined in a convenient position for ringing and other like work. When the hog-stock is in use, the swinging clamping-arms 16 are swung outward and laterally out of the way, and to enable the hog-stock to be removed and to be adjusted to suit different-sized animals I provide supports 26, provided on their inner sides with a plurality of grooved ways 27, arranged one above the other and adapted to receive the ends of the baseboard 20. By this construction the hog-stock may be slid into and out of position for use at will and adjusted relatively to the floor 2 to suit the height of the animal whose head is to be confined.

From the foregoing description, taken in connection with the accompanying drawings, the construction, mode of operation, and advantages of the invention will be readily understood, and it will be seen that it provides a convenient construction of device for the purpose stated.

Changes in the form, proportion, and minor details of construction of the device may be made within the scope of the invention without departing from the spirit or sacrificing any of the advantages thereof.

Having thus described my invention, what I desire to secure by Letters Patent is—

1. In a stock-stall or pen of the character described, the combination of a pen provided with a door and at the opposite end with stanchions for confining the animal, and a head-clamp consisting of laterally-swinging jaws provided with openings, and a securing device for connecting said jaws, substantially as described.

2. In a stock-stall or pen of the character described, the combination of a pen provided with a door and at the opposite end with stanchions for confining the animal, and a head-stock comprising side supports having a series of horizontal guideways, a base adapted to be fitted in said guideways, a fixed clamping-bar, and an adjustable pivoted clamping-bar coöperating therewith, said bars being mounted on the base, substantially as described.

In testimony whereof I have hereunto set my hand in presence of two subscribing witnesses.

J. H. GOLLYER.

Witnesses:
GEO. W. ROBERTS,
WILLIAM A. LACY.